US011313562B2

(12) United States Patent
Schmitz et al.

(10) Patent No.: US 11,313,562 B2
(45) Date of Patent: Apr. 26, 2022

(54) METHOD FOR OPERATING A BURNER ARRANGEMENT OF A GAS TURBINE

(71) Applicant: Siemens Energy Global GmbH & Co. KG, Munich (DE)

(72) Inventors: Udo Schmitz, Mulheim an der Ruhr (DE); Carsten Seiler, Recklinghausen (DE); Stefan Wyhnalek, Duisburg (DE)

(73) Assignee: Siemens Energy Global GmbH & Co. KG, Munich (DE)

(*) Notice: Subject to any disclaimer, the term of this patent is extended or adjusted under 35 U.S.C. 154(b) by 75 days.

(21) Appl. No.: 16/957,226

(22) PCT Filed: Jan. 22, 2019

(86) PCT No.: PCT/EP2019/051492
§ 371 (c)(1),
(2) Date: Jun. 23, 2020

(87) PCT Pub. No.: WO2019/158323
PCT Pub. Date: Aug. 22, 2019

(65) Prior Publication Data
US 2020/0393131 A1 Dec. 17, 2020

(30) Foreign Application Priority Data

Feb. 13, 2018 (DE) .................. 10 2018 202 177.5
Apr. 27, 2018 (EP) ................................ 18169890

(51) Int. Cl.
*F23R 3/34* (2006.01)
*F02C 9/26* (2006.01)
(Continued)

(52) U.S. Cl.
CPC .............. *F23R 3/346* (2013.01); *F02C 7/228* (2013.01); *F02C 9/26* (2013.01); *F23R 3/343* (2013.01);
(Continued)

(58) Field of Classification Search
CPC .. F23R 3/34; F23R 3/343; F23R 3/346; F02C 7/228; F02C 7/232; F02C 9/26;
(Continued)

(56) References Cited

U.S. PATENT DOCUMENTS 4,344,280 A * 8/1982 Minakawa ................ F23R 3/28
60/39.092
4,949,538 A * 8/1990 Iasillo ..................... F02C 7/228
60/39.465
(Continued)

FOREIGN PATENT DOCUMENTS

WO 2015112515 A1 7/2015

OTHER PUBLICATIONS

PCT International Search Report and Written Opinion of International Searching Authority dated May 14, 2019 corresponding to PCT International Application No. PCT/EP2019/051492 filed Jan. 22, 2019.

*Primary Examiner* — William H Rodriguez

(57) ABSTRACT

A method for operating a burner arrangement of a heat engine, particularly a gas turbine, having a plurality of burners, each having at least one pilot burner and main burner, in which method, on the basis of a preset operation of the heat engine, the total quantity of fuel supplied to the burners is maintained substantially constant in a load-controlled manner: in a first group of burners, for each burner, both the pilot burner as well as the main burner are supplied with fuel; in a second group of burners, the fuel supply to the main burners is interrupted, while the pilot burners continue to be operated; and the fuel quantity remaining as a result of the interruption of the fuel supply to the main burners of the second group is redistributed to the still active main burners of the first group. CO emissions are reduced as a result.

16 Claims, 4 Drawing Sheets

(51) Int. Cl.
*F02C 7/228* (2006.01)
*F23C 6/02* (2006.01)

(52) U.S. Cl.
CPC ............ *F23C 6/02* (2013.01); *F23C 2201/20* (2013.01); *F23C 2201/30* (2013.01); *F23N 2237/02* (2020.01)

(58) Field of Classification Search
CPC .... F23N 2237/02; F23N 1/00; F23C 2201/20; F23C 2201/30
See application file for complete search history.

(56) References Cited

U.S. PATENT DOCUMENTS

| | | | | |
|---|---|---|---|---|
| 6,092,362 | A * | 7/2000 | Nagafuchi | F02C 9/34 60/39.281 |
| 7,624,564 | B2 * | 12/2009 | Stuttaford | F02C 7/22 60/39.281 |
| 2004/0255594 | A1 | 12/2004 | Baino et al. | |
| 2011/0016873 | A1 * | 1/2011 | Nakamura | F02C 9/34 60/772 |
| 2013/0091824 | A1 * | 4/2013 | Murakami | F02C 7/222 60/39.094 |
| 2014/0061327 | A1 * | 3/2014 | Hughes | F23R 3/346 239/5 |
| 2014/0123651 | A1 | 5/2014 | Smith | |
| 2015/0354467 | A1 * | 12/2015 | Kishi | F02C 9/34 60/39.27 |
| 2016/0010493 | A1 | 1/2016 | ODea et al. | |
| 2021/0095599 | A1 * | 4/2021 | Asai | F02C 9/263 |

\* cited by examiner

METHOD FOR OPERATING A BURNER ARRANGEMENT OF A GAS TURBINE

CROSS REFERENCE TO RELATED APPLICATIONS

This application is the US National Stage of International Application No. PCT/EP2019/051492 filed 22 Jan. 2019, and claims the benefit thereof. The International Application claims the benefit of European Application No. EP18169890 filed 27 Apr. 2018 and the benefit of German Application No. DE 10 2018 202 177.5 filed 13 Feb. 2018. All of the applications are incorporated by reference herein in their entirety.

FIELD OF INVENTION

The invention relates to a method for operating a burner arrangement of a heat engine, particularly of a gas turbine, having a plurality of burners, each comprising at least one pilot burner and at least one main burner.

BACKGROUND OF INVENTION

At high gas turbine capacities, the multiple arrangement of burners produces a relatively uniform temperature profile, which minimizes NOx emissions. In ecological terms, this is a significant factor at high engine capacities, as the presence of hot streaks with low air ratios increases nitrogen oxide (NOx) emissions.

At low gas turbine capacities, the quantity of fuel is substantially reduced and, as a result of the change in the fuel/air mixture, the burners are operated with cooler flames. This effect results in a poor burnout of fuel and high carbon monoxide (CO) emissions in the exhaust gas.

At present, the issue of high air ratios and comparatively low combustion temperatures is resolved by reducing the quantity of air involved in combustion in the entire combustion chamber. The difficulty is that the quantity of air cannot be arbitrarily reduced such that a critical air ratio, which results in high CO emissions and poor burnout of fuel, is not exceeded. In consequence, emissions at a low power output are increased, or the minimum power output is limited by permissible emissions.

In US 2014/0123651 A1, a method is disclosed wherein emissions associated with the combustion of a gas turbine are detected and, on the basis of the measured values, the quantity of fuel delivered to individual stages of a multi-stage burner is reset, such that the emission values from the burners are adjusted.

SUMMARY OF INVENTION

The object of the invention is the proposal of an operating mode of a burner arrangement of a heat engine, particularly of a gas turbine, which is operated with a low power output, which is improved with respect to CO emissions.

According to the invention, the object is fulfilled by a method for operating a burner arrangement of a heat engine, particularly of a gas turbine, having a plurality of burners, each comprising at least one pilot burner and at least one main burner, wherein, on the basis of a preset operation of the heat engine, in a load-controlled manner: —the total quantity of fuel supplied to the burners is maintained substantially constant, —in a first group of burners, in each burner, both the pilot burner and the main burner are supplied with fuel, —in a second group of burners, the fuel supply to the main burners is interrupted, whereas the pilot burners continue to be operated, and—the quantity of fuel remaining as a result of the interruption in the fuel supply to the main burners of the second group is redistributed to the still active main burners of the first group.

By the term "load-controlled", it is understood that the total quantity of fuel for a predefined or set load remains constant. The term "load-controlled" is specifically to be understood with respect to any load with effect from the achievement of the nominal speed of rotation of the heat engine. In the event of a change in the load, optionally, a different total quantity of fuel is required. The new total quantity, within the context of technically feasible tolerances, is also maintained constant, provided that the load does not change. In general, minor deviations from a constant mass flow are only applied in the event of an improvement in burnout, i.e. a reduction in CO emissions or further burnout can result in the achievement of a smaller quantity of fuel with a constant capacity. The preset operation of the heat engine can be e.g. standard operation, wherein all the pilot burners and all the main burners are supplied with fuel, although the method according to the invention is not only limited to this initial state.

A "plurality of burners" signifies that at least two burners are provided, although this term preferably implies a multiplicity of burners. The burners respectively comprise one or more pilot burners and one or more main burners. The main burners can be configured as premix burners, wherein fuel and combustion air are mixed upstream of the burner flame. The pilot burners can be configured both as premix burners and as diffusion burners, and as combinations thereof. In addition to the start-up of the gas turbine, the function of the pilot burners is also the stabilization of combustion, particularly of the premix flame, in part-load and full-load operation.

By "interruption in the fuel supply to the main burners of the second group", it is to be understood that the infeed of fuel is set to zero. This is achieved e.g. by means of a shut-off device in the corresponding fuel line. In particular, a reduction or variation only of the infeed of fuel to the main burners of the second group does not occur.

In particular, the redistribution of the fuel is a uniform redistribution, wherein an equal proportion of the remaining quantity of fuel is fed to each of the still active main burners.

The invention is based upon the concept whereby, by an appropriate distribution of the fuel to the individual burners, CO emissions, particularly at a low power output of the heat engine, can be reduced, and overall fuel burnout can simultaneously be improved. Depending upon the operating mode of the burners, the latter are subdivided into at least two groups, wherein one group can comprise either a plurality of burners or a single burner.

The operating mode of the burner arrangement according to the invention is based upon the following characteristics:

In the case of the burners in the first group, both the pilot burners and the main burners are supplied with fuel. The burners in the first group are also described hereinafter as "hot" burners.

Where at least one burner is provided, the fuel supply to the main burner is interrupted, which is achieved, for example, by means of a shut-off device in the supply lines. This single burner or this plurality of burners constitute the second group. The pilot burners of the second group remain in service. The burners in the second group are described hereinafter as "warm" burners. The surplus fuel resulting from the switch-off of the main burners in the second group is redistributed to the main burners in the first group (the "hot" burners), the supply of which has not been interrupted. This advantageously results in the operation of the "hot" burners with a lower air ratio and a higher combustion temperature, thereby resulting in a reduced CO output.

Thus, rather than the adjustment of the total quantity of air in the compressor and the quantity of air in the entire combustion chamber, in order to achieve the optimum air ratio by means of the burners, according to the invention, a targeted and engine-load-controlled local redistribution of the quantity of fuel is achieved by means of the special operating mode of the burners. This operating mode, particularly in the low capacity range, permits an additional emission-compliant reduction in power output, or a reduction in emissions at constant capacity.

According to a variant of embodiment, in a third group of burners, the fuel supply both to the main burners and to the pilot burners is interrupted, and the remaining quantity of fuel is redistributed to the still active main burners in the first group. These burners are described hereinafter as "cold" burners. Burners, wherein the fuel supply both to the main burners and to the pilot burners is interrupted, generate no emissions. The remaining fuel is redistributed to the other main burners, the supply of which has not been interrupted.

At low engine capacities, it is thus possible for burners to be correspondingly operated within the optimum air ratio range, with low CO emissions ("hot" burners). In the region of the "cold" burners, no CO emissions are generated, as the latter are not supplied with fuel. The "warm" burners thus screen the "hot" region in the burner arrangement from the "cold" region of the burner arrangement.

In the interests of the secure and trouble-free operation of the burner arrangement, advantageously a maximum of 30% of the burners are included in the third group. However, the third group can also comprise 0 burners, i.e. the "cold" burners are omitted. Advantageously, a maximum of 40% of the burners are included in the second group.

According to a further variant of embodiment, the pilot burners of the burners in the second group are operated with a lower air ratio than the pilot burners in the first group. To this end, the installation of additional line components and valves is required, specifically including control valves in the lines to the pilot burners of at least the second group. Here again, combustion with a lower air ratio results in a high combustion temperature, and thus a reduced output of CO.

Advantageously, the number of burners with an at least partially interrupted fuel supply is varied, particularly in accordance with the capacity of the heat engine. This means that, in a period during which the power output is unchanged, the total quantity of fuel remains virtually constant, although the fuel is redistributed to the active burners in the interests of the optimum operation of the heat engine with respect to CO emissions.

Moreover, in a further time period, in the event of a change in the load or the power output, a further redistribution of the fuel may be undertaken. The number of "hot", "warm" and "cold" burners is varied in accordance with the power output, such that the air ratio setting for the "hot" burners remains within the optimum range with respect to emissions and hardware (not too hot and not too cold). Preferably, the number of "warm" and "hot" burners at low capacities is reduced.

In the interests of low NOx emissions, the main burners are advantageously operated in premix mode.

Appropriately, the above-mentioned method is applied at a power output which lies below the rated capacity of the heat engine, e.g. for the start-up of the heat engine.

The method according to the invention can be combined with other measures, in order to reduce emissions at a low power output. Measures of this type for reducing the quantity of air in the combustion chamber include, for example, a reduction of the overall quantity of air, e.g. by the further throttling of the compressor, or by means of an air bypass and the redesign of the main/pilot burners.

The object is further fulfilled according to the invention by a combustion system for a heat engine, comprising a burner arrangement having a plurality of burners, each of which comprises at least one pilot burner and at least one main burner, an auxiliary system for the supply of fuel to the burners and a controller. The advantages described above with respect to the method and advantageous configurations are correspondingly transferable to the combustion system.

Preferably, between a burner in the first group and a burner in the third group, at least one burner in the second group is arranged. The primary function of the burners in the second group is thus the mutual screening of the burners in the first and third group. If a "hot" burner is screened by at least one adjacently positioned "warm" burner, the adjoining burner can be operated "cold".

According to a configuration, the burner arrangement comprises separate fuel lines to the pilot burners and the main burners, wherein shut-off devices are at least installed in the fuel lines to the main burners in the second group and the third group.

The main burners are advantageously configured as premix burners.

According to a further configuration, the auxiliary system comprises a first subsystem and a second subsystem, wherein the first subsystem is designed for the supply of the main burners and the pilot burners in the first group, and the second subsystem is designed for the supply of the pilot burners in the second group. It is provided that the delivery of fuel to the pilot burners in the first group by the first subsystem is reduced exactly by the quantity of fuel which is delivered by the second subsystem to the pilot burners in the second group, as a result of which a constant overall mass flow of fuel within the auxiliary system is ensured.

The burner arrangement is appropriately configured as an annular combustion chamber.

Finally, the object is fulfilled according to the invention by a heat engine, particularly a gas turbine, having a combustion system of the above-mentioned type. The advantages described above with respect to the method and the combustion system, and advantageous configurations, are correspondingly also transferable to the gas turbine.

BRIEF DESCRIPTION OF THE DRAWINGS

Exemplary embodiments of the invention are described hereinafter with reference to a drawing. Herein, in the individual figures.

DETAILED DESCRIPTION OF INVENTION

In the figures, identical reference symbols have the same meaning.

Figure 1:
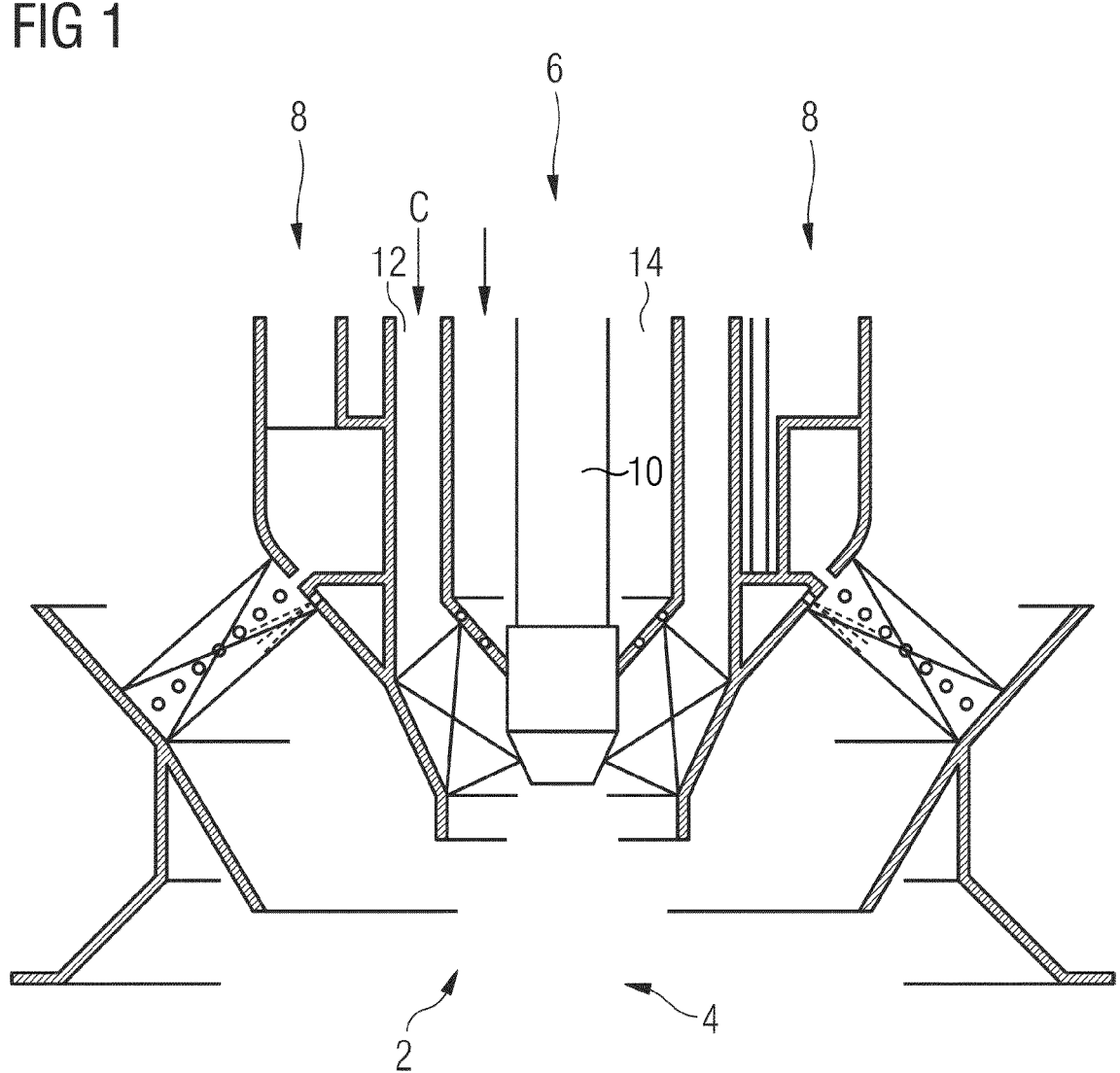
FIG. 1: shows a section of a burner, comprising a pilot burner and a main burner.

FIG. 1 shows a burner 2 which, in combination with a plurality of identical burners, is employed, for example, in the combustion chamber 4 of a gas turbine installation which is not represented in greater detail.

The burner 2 is comprised of an inner section, the pilot burner 6, and an outer section which is arranged concentrically thereto, the main burner system or main burner 8. Both the pilot burner 6 and the main burner 8 are suitable for operation with gaseous and/or liquid fuels, in any arbitrary combination.

The pilot burner 6 comprises an inner gas infeed duct 14 (medium B), which is arranged concentrically about a duct 10. In turn, this is enclosed by an inner air infeed duct 12 (medium C), which is arranged concentrically about the axis of the burner 2. An appropriate ignition system can be arranged in or on the inner air infeed duct 12, many options for the embodiment of which are known, and the representation of which has therefore been omitted here.

The pilot burner 6 can be operated in a manner which is known per se, i.e. predominantly as a diffusion burner. The function thereof is the maintenance of the stable combustion operation of the main burner 8, as the latter is generally operated with a lean mixture, in order to reduce pollutant emissions.

Figure 2:
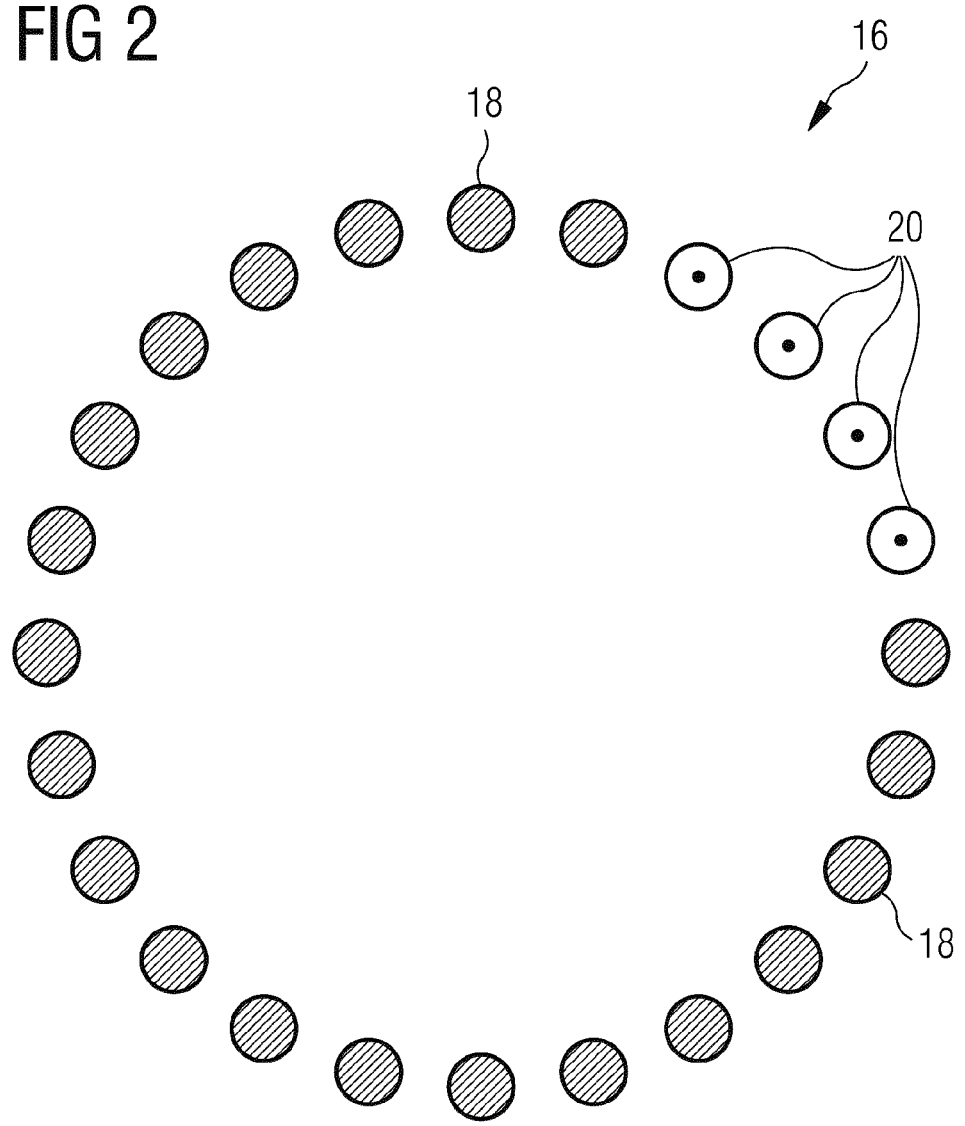
FIG. 2: shows a schematic representation of an annular burner arrangement, having a first configuration of burners subdivided into two groups.

FIG. 2 illustrates a burner arrangement 16 having a plurality of burners 2, and which particularly forms part of an annular combustion chamber of a gas turbine which is not represented in greater detail. The burner arrangement 16 comprises twenty-four burners 2. Twenty of the burners, which constitute a first group 18 (represented by filled-in circles), are operated as "hot" burners, i.e. in each burner 2, both the pilot burner 6 and the main burner 8 are supplied with fuel. The four other burners constitute a second group 20 (represented as a circle with a center point) of "warm" burners 2, in which the fuel supply to the main burners 8 is interrupted, wherein the pilot burners 6 continue to be operated. To this end, shut-off devices are incorporated into the lines to the main burners 8, which interrupt the infeed of fuel within a few seconds, for example in two seconds. The remaining quantity of fuel resulting from the interruption in the fuel supply to the main burners 8 in the second group 20 is redistributed to the still active main burners 8 in the first group 18. At the same time, an adjustment of the air ratio in the pilot burners 6 of the second group 20 can be undertaken, wherein a lower air ratio than that in the pilot burners 6 of the first group 18 is set.

Figure 3:
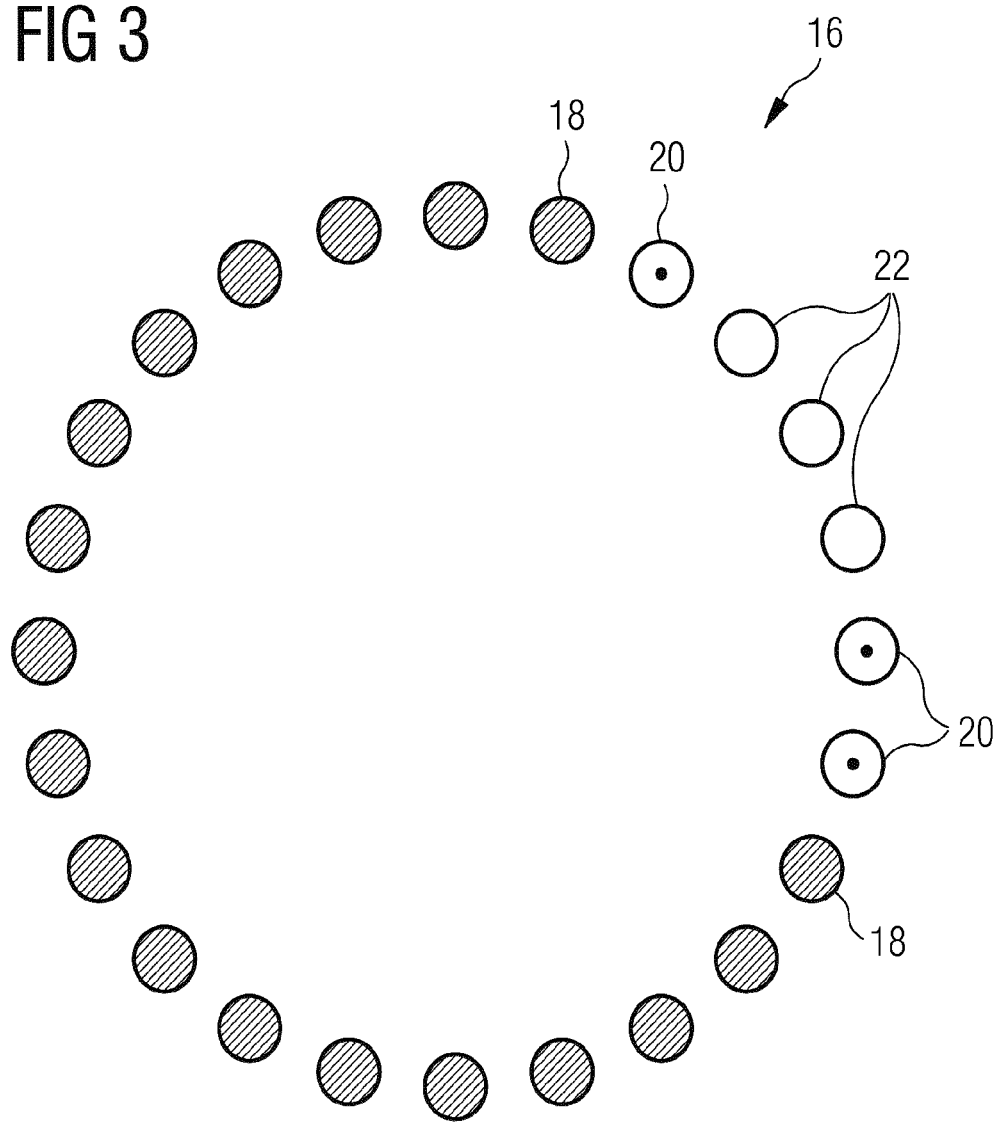
FIG. 3: shows a schematic representation of the annular burner arrangement according to FIG. 1, having a second configuration of burners subdivided into three groups.

FIG. 3 illustrates the same burner arrangement 16, wherein the mode of operation of the burners 2 is different. Of the twenty-four burners 2, only eighteen are included in the first group 18, three are included in the second group 20, and three further burners constitute a third group 22 of "cold" burners (represented by a circle) which are completely isolated from the fuel supply, such that fuel is fed to neither the pilot burners 6 nor the main burners 8 of this group 22.

Upon the transition from one configuration to the other, the total quantity of fuel delivered to the burner arrangement 16, in a load-controlled manner, remains constant at all times. For example, upon the transition from the standard operation of the annular combustion chamber, with "hot" burners only, to a configuration according to the invention with "warm" and, optionally, also "cold" burners 2, the total quantity of fuel does not generally change. In particular, operation with "warm" and "cold" burners 2 is executed at a gas turbine capacity below the rated capacity.

Further configurations involving "hot", "warm" and, optionally, "cold" burners 2 are also possible wherein, for example, the respective groups may be distributed over a number of locations. However, it is important that, in all cases, "hot" burners are screened from the "cold" burners 2 by "warm" burners 2, i.e. at least one burner 2 in the second group 20 is arranged between a burner 2 in the first group 18 and a burner 2 in the third group 22.

Figure 4:
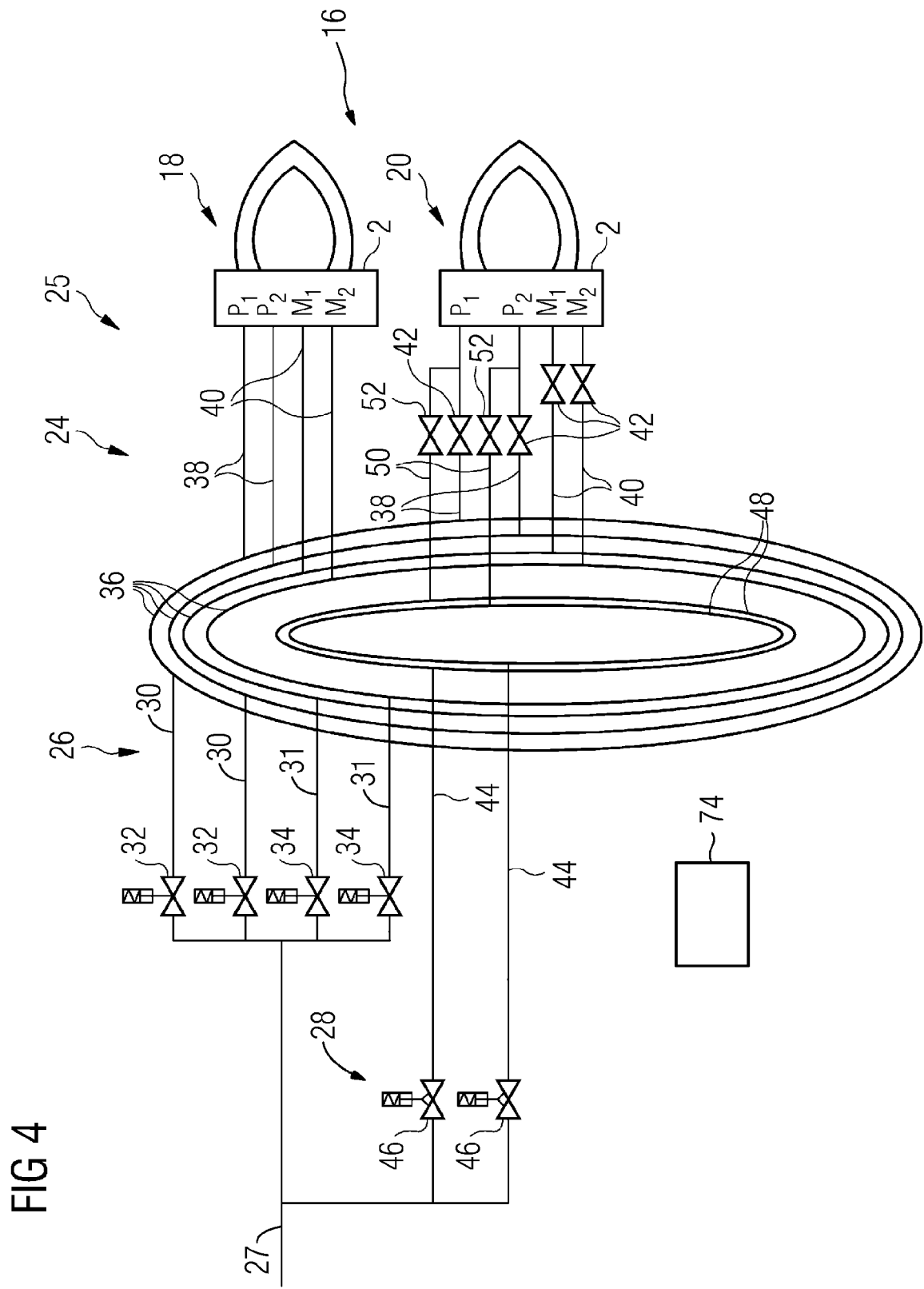
FIG. 4: shows an auxiliary system for the supply of fuel to a burner arrangement.

FIG. 4 shows an exemplary representation of an auxiliary system 24 for the supply of fuel to a burner arrangement 16, wherein the auxiliary system 24 and the burner arrangement 16 constitute a combustion system 25. A central supply line 27 forms part of the auxiliary system 24. The burner arrangement 16 comprises e.g. twenty-four burners, which are subdivided into two groups 18, 20, which groups 18, 20 are symbolically represented in the figure by two burners 2.

The burners 2 in the first burner group 18 are designed to be operated as "hot" burners, and the burners 2 in the second group 20 are designed to be operated as "warm" burners. In the embodiment represented, each of the burners 2 comprises a two-stage pilot burner, wherein the two stages are identified by the symbols $P_1$, $P_2$. Each of the burners 2 further comprises a two-stage main burner, the two stages of which are identified by the symbols $M_1$, $M_2$. However, other configurations of single- or multi-stage pilot and/or main burners are also conceivable.

In the exemplary embodiment represented, the infeed of fuel to the two burner groups 18, 20 is delivered by means of separately controlled supplies, wherein the auxiliary system 24 is subdivided into two subsystems 26, 28.

The first subsystem 26 comprises first lines 30 for the pilot burner stages $P_1$, $P_2$, and second lines 31 for the main burner stages $M_1$, $M_2$ of both burner groups 18, 20. The quantity of fuel in the first and second lines 30, 31 is adjusted by means of first control components 32 or second control components 34, wherein the control components 32, 34 are particularly configured as control valves. The lines 30, 31 respectively terminate in a ring line 36. From thence, by means of first spur lines 38, both pilot burner stages $P_1$, $P_2$ of all the pilot burners and, by means of second spur lines 40, both main burner stages $M_1$, $M_2$ of all the main burners are supplied. In the spur lines 38, 40 of the second burner group 20, moreover, shut-off valves 42 are installed. The first subsystem 26 is particularly intended for the supply of fuel to all the burners 2 of the burner arrangement 16 in on-site operation.

The second subsystem 28 is similarly structured, and comprises third lines 44, in which control components 46 are installed, down-circuit ring lines 48 and further spur lines 50 to the pilot burner stages $P_1$, $P_2$ of the second group 20, wherein shut-off valves 52 are installed in the further spur lines 50.

In standard operation, wherein both the pilot burners 6 and the main burners 8 of the burners 2 in both groups 18, 20 are operated, the shut-off valves 42 of the first subsystem 26 are open and the shut-off valves 52 of the second subsystem 28 are closed. Upon the switchover to "hot"/"warm" operation, all the shut-off valves 42 in the spur lines 38 and 40 of the second group 20 are closed, whereas the shut-off valves 52 are opened, as a result of which the pilot burners in the second group 20 are supplied with fuel by the second subsystem 28.

As the shut-off valves 42 to the main burners in the second group 20 are closed, the fuel in the first subsystem 26 is redistributed to the main burners in the first group 18. A constant mass flow of fuel delivered to the pilot burners of the first group 18 is maintained. This is achieved, wherein the quantity of fuel delivered to the pilot burners of the first group 18 is throttled by the control valves 32, in order to compensate for the quantity of fuel which is no longer required for the pilot burners of the second group 20. The control valves 32 thus reduce the throughflow in the first lines 30 exactly by the quantity which is fed by the second subsystem 28 to the pilot burners in the second group 20. Further to the execution of the switchover, the quantity of fuel delivered to the pilot burners of the second group 20 is controllable independently of the quantity of fuel delivered to the pilot burners of the first group 18, and an optimum quantity setting is executed, according to the load. In total, the overall quantity of fuel in the auxiliary system 24 thus remains constant.

By means of the second subsystem 28 illustrated, the burners 2 can be operated as burners in both the second group 20 and the third group 22, i.e. by means of the second subsystem 28, the infeed of fuel both to the main burners and to the pilot burners in this group can be interrupted.

The controllable valves of the combustion system 25 are actuated by a controller 74, which is symbolically represented in FIG. 4. In particular, the controller 74 constitutes part of the combustion system 25.

The invention claimed is:

1. A method for operating a burner arrangement of a heat engine or of a gas turbine, having a plurality of burners, each comprising at least one pilot burner and at least one main burner, wherein, on the basis of a preset operation of the heat engine, in a load-controlled manner, the method comprising:
    maintaining a total quantity of fuel supplied to the burners substantially constant,
    in a first group of burners, in each burner, supplying both the pilot burner and the main burner with fuel,
    in a second group of burners, interrupting the fuel supply to the main burners, wherein the pilot burners continue to be operated, and
    redistributing the quantity of fuel remaining as a result of the interruption in the fuel supply to the main burners of the second group to the main burners of the first group which are still active.

2. The method as claimed in claim 1, further comprising:
    in a third group of burners, interrupting the fuel supply both to the main burners and to the pilot burners, and redistributing the remaining quantity of fuel to the main burners in the first group which are still active.

3. The method as claimed in claim 2,
    wherein a maximum of 30% of the burners are included in the third group.

4. The method as claimed in claim 1,
    wherein a maximum of 40% of the burners are included in the second group.

5. The method as claimed in claim 1,
    wherein the pilot burners of the burners in the second group are operated with a lower air ratio than the pilot burners in the first group.

6. The method as claimed in claim 1,
    wherein a number of burners with an at least partially interrupted fuel supply is varied, in accordance with the capacity of the heat engine.

7. The method as claimed in claim 1,
    wherein the main burners are operated in premix mode.

8. The method as claimed in claim 1,
    which is applied at a power output which lies below the rated capacity of the heat engine.

9. A combustion system for a heat engine, comprising:
    a burner arrangement having a plurality of burners, each of which comprises at least one pilot burner and at least one main burner,
    an auxiliary system for the supply of fuel to the burners, and
    a controller, which is configured to:
    maintain a total quantity of fuel supplied to the burners substantially constant,
    in a first group of burners, in each burner, supply both the pilot burner and the main burner with fuel,
    in a second group of burners, interrupt the fuel supply to the main burners, wherein the pilot burners continue to be operated, and
    redistribute the quantity of fuel remaining as a result of the interruption in the fuel supply to the main burners of the second group to the main burners of the first group which are still active.

10. The combustion system as claimed in claim 9, further comprising:
    a third group of burners,
    wherein, between a burner in the first group and a burner in the third group, at least one burner in the second group is arranged.

11. The combustion system as claimed in claim 10, further comprising:
    separate fuel lines to the pilot burners and main burners, wherein shut-off devices are at least installed in the fuel lines to the main burners in the second group and the third group.

12. The combustion system as claimed in claim 9, wherein the main burners are configured as premix burners.

13. The combustion system as claimed in claim 9,
    wherein the auxiliary system comprises a first subsystem and a second subsystem, wherein the first subsystem is designed for the supply of the main burners and the pilot burners in the first group, and the second subsystem is designed for the supply of the pilot burners in the second group.

14. The combustion system as claimed in claim 9,
    wherein the burner arrangement is configured as an annular combustion chamber.

15. A heat engine, comprising:
    a combustion system as claimed in claim 9.

16. The heat engine of claim 15,
    wherein the heat engine comprises a gas turbine.

* * * * *